United States Patent
Michel

(10) Patent No.: US 8,971,890 B2
(45) Date of Patent: Mar. 3, 2015

(54) METHOD FOR HANDING OVER A USER EQUIPMENT CONNECTED TO A BASE STATION FRO THE BASE STATION TO A FEMTO ACCESS POINT

(75) Inventor: Juergen Michel, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 386 days.

(21) Appl. No.: 13/390,827

(22) PCT Filed: Aug. 17, 2009

(86) PCT No.: PCT/EP2009/060621
§ 371 (c)(1),
(2), (4) Date: Mar. 29, 2012

(87) PCT Pub. No.: WO2011/020488
PCT Pub. Date: Feb. 24, 2011

(65) Prior Publication Data
US 2012/0231792 A1    Sep. 13, 2012

(51) Int. Cl.
*H04W 4/00* (2009.01)
*H04W 36/00* (2009.01)
*H04W 36/04* (2009.01)
*H04W 84/04* (2009.01)

(52) U.S. Cl.
CPC ......... *H04W 36/0083* (2013.01); *H04W 36/04* (2013.01); *H04W 84/045* (2013.01)
USPC ........................................ 455/436; 370/331

(58) Field of Classification Search
CPC ... H04W 36/0083; H04W 36/04; H04W 4/00; H04W 84/045
USPC ................... 455/436, 444; 370/331, 336, 328
See application file for complete search history.

(56) References Cited

U.S. PATENT DOCUMENTS

| | | | | |
|---|---|---|---|---|
| 2008/0305801 | A1 | 12/2008 | Burgess et al. | 455/444 |
| 2009/0132675 | A1* | 5/2009 | Horn et al. | 709/207 |
| 2011/0243097 | A1* | 10/2011 | Lindqvist et al. | 370/331 |

FOREIGN PATENT DOCUMENTS

| | | |
|---|---|---|
| GB | 2 287 858 A | 9/1995 |
| WO | WO 2007/010304 A1 | 1/2007 |
| WO | WO 2009/006041 A1 | 1/2009 |

* cited by examiner

*Primary Examiner* — Nizar Sivji
(74) *Attorney, Agent, or Firm* — Harrington & Smith

(57) ABSTRACT

A method is described for handing over a user equipment connected to a base station from the base station to a femto access point. The method includes initializing a handover from the base station to the femto access point, sending parameters indicating the femto access point from the user equipment to the base station, wherein the parameters include a physical ID parameter and a further parameter based on time measurements, identifying the femto access point by comparing the parameters sent from the user equipment to the base station with a list stored in the base station, wherein the list includes a physical ID parameter, a further parameter based on time measurements and a global ID for a plurality of femto access points, and handing over the user equipment to the identified femto access point. Also described is a base station, a user equipment and a system.

13 Claims, 1 Drawing Sheet

METHOD FOR HANDING OVER A USER EQUIPMENT CONNECTED TO A BASE STATION FRO THE BASE STATION TO A FEMTO ACCESS POINT

FIELD OF INVENTION

The present invention relates to the field of wireless communication networks. In particular, the invention relates to a method for handing over a user equipment connected to a base station from the base station to a femto access point. Further, the invention relates to a base station and user equipment.

ART BACKGROUND

A typical mobile communication network, for example a wide area network, comprises base stations and user equipments, as well as access points, like femto access points. In particular, such a mobile communication network may be a UMTS, a 3GPP Long-Term-Evolution (LTE) or 3GPP Long-Term-Evolution-Advanced network (LTE-A). The base stations may be a NodeB (NB) or enhanced NodeB (eNodeB, eNB) User equipments may be handed over from base stations to femto access points like Home eNode Bs (HeNBs).

For the handover, a PCI (physical cell ID) algorithm may be used, wherein a PCI value is assigned to each base station or femto access point. In traditional wide area networks, a centralized PCI selection algorithm relies on the OAM (operation and maintenance) to provide a single PCI value that is not in collision with any of its neighbors. For a network planned macro deployment, this is possible to achieve, based on careful design (centralized planning of PCIs). However in an uncoordinated, heterogeneous network deployment with HeNBs or pico cells this is difficult to achieve. HeNBs are deployed in an ad-hoc manner. Exact location is impossible to determine in many cases. Even if the HeNBs report detailed radio measurements to OAM, such radio measurements can change very quickly. The HeNB itself may be moved. Therefore PCI assignment can never eliminate collisions in uncoordinated, heterogeneous networks.

There may be a need for providing a reliable and computational inexpensive method for handing over a user equipment connected to a base station from the base station to a femto access point.

SUMMARY OF THE INVENTION

This need may be met by the subject matter according to the independent claims. Advantageous embodiments of the present invention are described by the dependent claims.

According to a first aspect of the invention there is provided a method for handing over a user equipment connected to a base station from the base station to a femto access point. The method comprises initializing a handover from the base station to the femto access point, sending parameters indicating the femto access point from the user equipment to the base station, wherein the parameters comprise a physical ID parameter and a further parameter based on time measurements, identifying the femto access point by comparing the parameters sent from the user equipment to the base station with a list stored in the base station, wherein the list comprises a physical ID parameter, a further parameter based on time measurements and a global ID for a plurality of femto access points, and handing over the user equipment to the identified femto access point.

Before the user equipment (UE) is able to send a measurement report, it must identify the target cell. The UE may identify the cell using the synchronization signals (=PCI). Further, the UE may measure the signal level using the reference symbols. When reporting threshold condition is fulfilled, the UE may send handover measurements to the eNB or base station. Measurements from neighboring cells with same PCI can not be distinguished at serving eNB.

Timing of different HeNBs or femto access points to a macro cell is in general random and different among neighboring HeNBs. With reporting of time difference between synchronization sequence of HeNBs to wide area cell in addition to usual handover measurement parameters (PCI, received signal strength and/or quality measurements), the measured information may be distinguished and associated to different HeNBs at wide area cell even if HeNBs have the same PCI.

This may be done by utilizing the reported time offset information and the PCI by the wide area eNB to determine the global and unique HeNB cell ID.

If a UE is moving towards a new cell, it may identify the physical cell identity (PCI) based on synchronization signals. When the handover reporting threshold has been fulfilled and the PCI indicates a HeNB, the UE may send a measurement report to serving eNB including PCI and a further parameter, like timing difference, of the measured new cell to the serving eNB. Or in case a eNB receives a measurement report with PCI indicating a HeNB cell, the eNB may request this additional parameter.

The femto access point may be a home base station serving a home cell or a so called femto cell. The home respectively the femto cell may be for instance a small cellular region within the cellular telecommunication network. The home base station serving the femto cell may also be called a femto access point. The home base station is typically located at the premises of a customer of an internet service provider, of a customer of a mobile network operator and/or of a customer of any other telecommunication service provider.

The home base station may be a low cost, small and reasonably simple unit that can connect to a Base station Controller (in a Global System for Mobile communications (GSM) network) and/or to a core network (in a Long Term Evolution (LTE) network). By contrast to a wide area (WA) base station the home base station is a much cheaper and less powerful device. This may hold in particular for the spatial coverage. The home base station may be designed for a maximal number of users respectively a maximal number of communication devices, which maximal number is typically between 5 and 20. By contrast thereto, a WA base station may be designed for serving much more users respectively communication devices. A WA base station may serve for instance 50, 100 or even more users respectively communication devices.

A further important difference between a home base station serving a femtocell and a WA base station serving an overlay cell of a cellular telecommunication network can be seen in restricting the access of user equipments respectively communication devices. A home base station typically provides access to a closed user group and/or to predefined communication devices only. This may be achieved by a rights management system, which can be implemented in the home base station. With such a rights management system it may be prevented for instance that an unauthorized user can use a private and/or a corporate owned printer, which represents a communication device being assigned to the femtocell of the home base station. By contrast thereto, a WA base station provides an unlimited access for user equipments provided that the user of the respective user equipment has a general contract with the operator of the corresponding mobile telecommunication network or at least with an operator, which itself has a basic agreement with the operator of the WA base station.

In the following there will be described exemplary embodiments of the present invention.

According to an embodiment of the invention, the physical ID parameter may be a physical cell ID parameter. This parameter may be easily requested from the femto access point.

According to an embodiment of the invention, the method may further comprise requesting the global ID of the femto access point by the base station from the user equipment.

If there is no transport layer connection address already available and known to the target cell or if there is no global cell ID known, the serving eNB may request the global ID of the femto access point from the UE.

According to an embodiment of the invention, the method may further comprise decoding the global ID of the femto access point from an information about the femto access point being transmitted over a broadcast channel.

The eNB may request the UE to decode the global cell ID from the broadcast channel of the target cell to identify the cell uniquely. This information is sufficient to find unique transport layer address of target HeNB, even in case of HeNB PCI collision due to taking PCI and timing difference into account when calculating global cell ID.

According to an embodiment of the invention, the method may further comprise sending the global ID together with the parameters from the user equipment to the base station. The UE may send all information together to the base station.

According to an embodiment of the invention, the method may further comprise storing the global ID together with the physical ID parameter and the further parameter in a list stored in the base station. This information may then be used also for further UEs and handovers.

According to an embodiment of the invention, the time measurements may comprise a measurement of timing difference between the femto access point and the base station. The timing difference may be a time difference between synchronization sequence of a first femto access point to wide area cell or a second femto access point to wide area cell in addition to usual handover measurement parameters.

According to an embodiment of the invention, the further parameter may comprise a tolerance value. The parameter may comprise a timing difference tolerance since dependent on UE position and measurement accuracy timing difference between macro and HeNB cell has slight jitter.

According to a second aspect of the invention there is provided a user equipment connectable to a base station. The user equipment comprises a unit for initializing a handover from the base station to a femto access point, a unit for sending parameters indicating the femto access point to the base station, wherein the parameters comprise a physical ID parameter and a further parameter based on time measurements, the base station being adapted for identifying the femto access point by comparing the parameters sent from the user equipment to the base station with a list stored in the base station, wherein the list comprises a physical ID parameter, a further parameter based on time measurements and a global ID for a plurality of femto access points, and for handing over the user equipment to the identified femto access point.

According to a further aspect of the invention there is provided a base station adapted for handing over a user equipment connectable to the base station from the base station to a femto access point, the user equipment being adapted for initializing a handover from the base station to the femto access point. The base station comprises a unit for receiving parameters indicating the femto access point from the user equipment, wherein the parameters comprise a physical ID parameter and a further parameter based on time measurements, a unit for identifying the femto access point by comparing the parameters received from the user equipment with a list stored in the base station, wherein the list comprises a physical ID parameter, a further parameter based on time measurements and a global ID for a plurality of femto access points, and a unit for handing over the user equipment to the identified femto access point.

According to a further aspect of the invention there is provided a System adapted for handing over a user equipment connectable to a base station from the base station to a femto access point. The system comprises a user equipment and a base station as mentioned above.

According to a further aspect of the invention there is provided a computer-readable medium (for instance a CD, a DVD, a USB stick, a floppy disk or a hard disk), in which a computer program of handing over a user equipment connected to a base station from the base station to a femto access point is stored, which computer program, when being executed by a processor, is adapted to carry out or control a method for handing over a user equipment connected to a base station from the base station to a femto access point.

According to a further aspect of the invention there is provided a program element (for instance a software routine, in source code or in executable code) of handing over a user equipment connected to a base station from the base station to a femto access point, which program element, when being executed by a processor, is adapted to carry out or control a method for handing over a user equipment connected to a base station from the base station to a femto access point.

Handing over a user equipment connected to a base station from the base station to a femto access point which may be performed according to aspects of the invention can be realized by a computer program, that is by software, or by using one or more special electronic optimization circuits, that is in hardware, or in hybrid form, that is by means of software components and hardware components.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
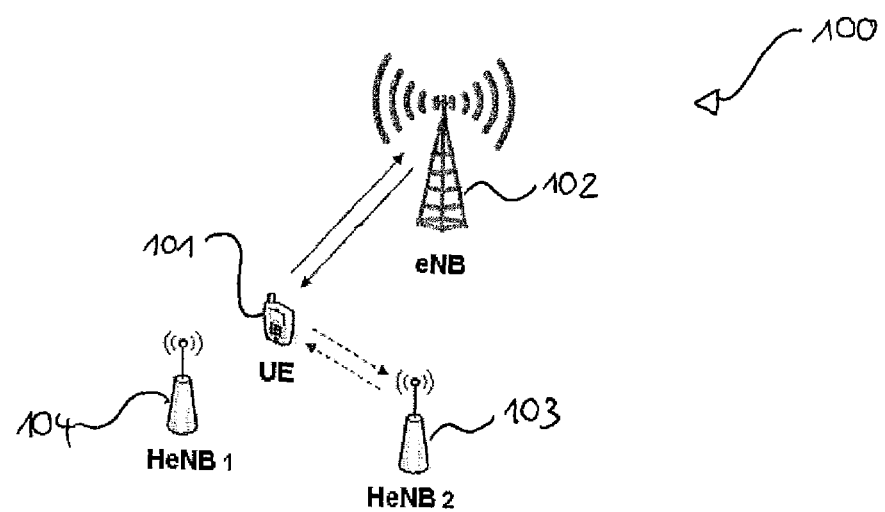
FIG. 1 shows a network system according to the invention.

The illustration in the drawing is schematically. It is noted that in different figures, similar or identical elements are provided with reference signs, which are different from the corresponding reference signs only within the first digit.

As described above, for handover, a PCI (physical cell ID) algorithm may be used, wherein a PCI value is assigned to each base station or femto access point.

Distributed algorithm benefit by taking location information into account, and allowing the HeNB to choose its PCI. The following mechanisms may be used.

First, an exclusive set of PCIs may be used for HeNBs only and random pick may be performed. In this case, there may be still a possibility that two neighboring HeNBs pick same PCI by random selection. Collisions between wide area and HeNB are prevented by use of exclusive set of PCIs for HeNBs.

Second, neighboring PCIs reported by UEs to HeNB may not be utilized. In this case, a HeNB cannot have any associated UEs until it starts transmitting. Therefore this method may not help during initial PCI selection. Even if a temporary initial PCI is used, a HeNB will likely have only a few associated UEs, and their reports may not provide a 360 degree view.

Third, a report over X2 interface may be performed. In this case, HeNBs do not mandatory have X2 interface, hence this method may not work always.

Fourth, PCIs not heard over the air may be utilized using downlink receiver. In this case, it may be that most HeNBs will have this mechanism, and it should clearly help reduce collisions. However, the range of a receiver co-located at the HeNB is less than the range of receivers of associated UEs. Therefore this mechanism can only partially eliminate PCI collisions. This is also often referred as "hidden node problem".

In the following a study of the PCI collision problem is shown for the following solutions:

The PCI for HeNB was considered to work so that the HeNB can autonomously pick a PCI from a list of PCIs allocated for HeNB use (exclusive set for wide are NBs and other set of PCI numbers for HeNBs)

Further the HeNB has integrated UE type receiver where it can scan its environment to see what PCIs are used nearby and not use those The simulation considers a heterogeneous deployment model where a number of HeNBs are deployed per macro eNBs cell area. Planned deployment for macro eNBs and random deployment for non-macro eNBs has been assumed and the PCI space is split into PCIs exclusively used for the eNBs and the HeNBs as mentioned above. As evaluation criterion a collision occurs when the ratio between the desired signal energy and the colliding signal energy becomes lower than 10 dB (6 dB) and when this cells have the same PCI.

500 non-macro eNBs dropped randomly per macro eNB cell area (Macro Network ISD=1000 m)

| Number of PCIs available for non-macro eNBs | Percentage of UEs observing collision of PCIs with random PCI allocation | Percentage of UEs observing collision of PCIs with random PCI allocation plus downlink receiver (sensitivity at −8 dB) |
|---|---|---|
| 10 | 15.2% (2.5%) | 11.7% (1.39%) |
| 50 | 3.3% (0.47%) | 2.4% (0.36%) |
| 100 | 1.7% (0.24%) | 1.2% (0.18%) |
| 200 | 0.9% (0.06%) | 0.6% (0.05%) |

The simulation shows that even a random assignment provides a pretty low collision rate with only 50 PCIs. It is important to note that the simulation is performed with a fairly dense concentration of non-macro HeNBs, to simulate worst possible scenario and for the 6 dB evaluation case with relaxed deployment ration (20%). Therefore from the radio layer perspective it can be concluded that basic standalone HeNB does not really suffer too much even if its neighbor has the same PCI in use and the case is rare.

With background information given above, it is clear that PCI collision among neighboring HeNBs with given solutions can be kept small dependent on PCI configuration (number of PCIs exclusively used by HeNBs) and with DL (downlink) receiver integrated in HeNB. Further as investigated from physical layer perspective the UE to HeNB connection does not really suffer much from this and collision probabilities as low as analyzed above in uncoordinated, heterogeneous deployments will be tolerated by the 3GPP standard. With this however in case of code collision HeNBs can not be distinguished in handover measurement reports.

FIG. 1 shows a network system 100 according to the present invention. It is described a possible handover example for the case of inbound handover of a UE 101 from wide area macro cell 102 to HeNB 103.

Assuming HeNB code collision, HeNB1 104 and HeNB2 103 would have the same PCI (for example PCI=13). Therefore, they can not be distinguished in handover measurements reported to the serving eNB as long as UE does not read full broadcast channel of HeNBs where global (long and unique) HeNB ID is transmitted. Consequently eNB can not associate handover measurements unambiguously to one of the two HeNBs.

Figure 2:
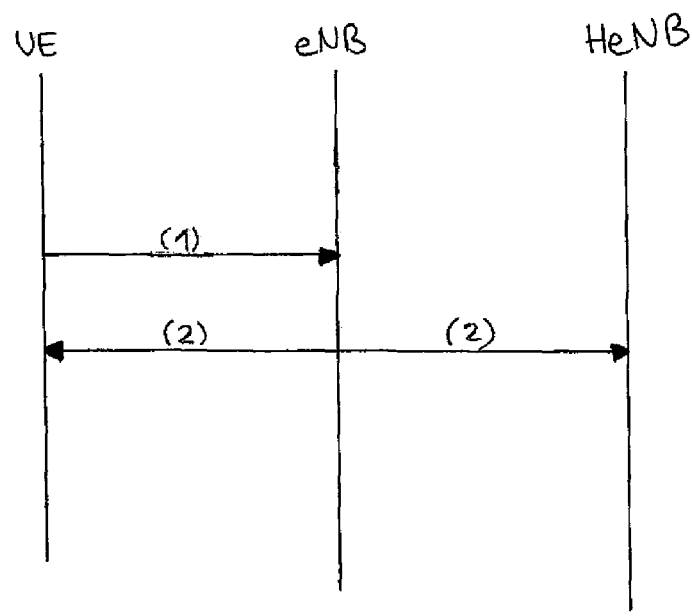
FIG. 2 shows a transactional flow diagram for handing over a user equipment connected to a base station from the base station to a femto access point.

Thus, before the UE is able to send the measurement report it must identify the target cell. The UE identifies the cell using the synchronization signals (=PCI). Further the UE measures the signal level using the reference symbols. Contrary to WCDMA in LTE there is no need for an E-UTRAN UE to read the broadcast channel during the handover measurements. When reporting threshold condition is fulfilled, the UE sends handover measurements to the eNB as shown in FIG. 2. Measurements from neighboring cells with same PCI (H(e)NB1 and H(e)NB2) can not be distinguished at serving eNB.

FDD HeNBs are expected to be deployed in an unsynchronized way (in time domain). Therefore timing of HeNB1 to macro cell and HeNB2 to macro cell is in general random and different among neighboring HeNBs. Then with reporting of time difference between synchronization sequence of HeNB1 to wide area cell or HeNB2 to wide area cell in addition to usual handover measurement parameters (PCI, received signal strength and/or quality measurements) the measured information can be distinguished and associated to HeNB1 or HeNB2 at wide area cell even if HeNBs have the same PCI.

This is done by utilizing the reported time offset information and the PCI by the wide area eNB to determine the global and unique HeNB ID. A lookup table in the wide area eNB could be automatically generated based on UE measurements and looks as follows:

| HeNB PCI | Timing difference of measured HeNB to connected/serving macro cell PSS/SSS [ms] | HeNB global ID |
|---|---|---|
| 4 | | |
| 13 | 5.2 ± Δ | 1024 |
| 13 | 2.7 ± Δ | 903 |

Δ (delta) is a timing difference tolerance since dependent on UE position and measurement accuracy timing difference between macro and HeNB cell has slight jitter.

Further the generation of this intra frequency neighbor list can be done automatically and UE based. This is typical solution in LTE automatic neighbor list generation feature as well in order to reduce effort especially when networks are expanded and sites are added (semi-dynamically).

Then if a UE is moving towards a new cell it identifies the physical cell identity (PCI) based on the synchronization signals. When the handover reporting threshold has been fulfilled and the PCI indicates a HeNB, the UE sends a measurement report to serving eNB including PCI and timing difference of the measured new cell to the serving eNB (Rel. 9 procedure). Or in case a eNB receives a measurement report with PCI indicating a HeNB cell, the eNB requests this additional timing difference measurement.

If there is no transport layer connection address already available and known to the target cell or if there is no global cell ID known, the serving eNB requests the UE to decode the global cell ID from the broadcast channel of the target cell to identify the cell uniquely. This information then is stored in the lookup table depicted above and is sufficient to find unique transport layer address of target HeNB (this can be requested from MME) even in case of HeNB PCI collision due to taking PCI and timing difference into account when calculating global cell ID.

The PCI is not enough to uniquely identify the cell since the number of physical cell IDs is just 504 while large networks can have tens of thousands of cells. For unique identification global cell ID transmitted over broadcast control channel is needed.

Another embodiment of this solution is, that in case a UE determines a PCI, which is from the PCI number by definition a HeNB PCI, then it sends a measurement report including the global cell ID which means the UE would then utilize not only the PSS/SSS and reference symbols but also would decode the broadcast channel to do the handover measurement which is a little bit more time consuming.

UE could store timing difference information and PCI in a table to implicitly generate the global cell ID from this without always having to decode the broadcast channel of the HeNB handover cell candidate.

FIG. 2 shows a transactional flow diagram for handing over a user equipment connected to a base station from the base station to a femto access point.

First, a UE sends (1) information comprising received signal strength received from a femto access point, a PCI value and a further parameter to the base station. Then, the base station may handover (2) the UE to the femto access point (HeNB), according to information received by the UE and/or stored in a lookup table in the base station.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method comprising:
   initializing a handover of a user equipment from a base station to a femto access point;
   requesting a global identifier of the femto access point from the user equipment; and
   in response to receiving at the base station, from the user equipment connected to the base station, parameters indicating the femto access point, wherein the parameters comprise a physical identifier parameter and a further parameter based on time measurements and comprising a tolerance value, wherein each of the time measurements comprises a measurement of a timing difference between the femto access point and the base station, wherein the timing difference comprises the time difference between the synchronization sequence of a first femto access point to a wide area cell and a synchronization sequence of a second femto access point to a wide area cell in addition to one or more handover measurement parameters and wherein the parameters further comprise the global identifier of the femto access point, decoded by the user device from information about the femto access point transmitted over a broadcast channel:
   identifying the femto access point by comparing parameters sent from the user equipment to the base station, wherein the parameters comprise the physical identifier parameter, the further parameter based on time measurements, and the global identifier of the femto access point, with a list of corresponding parameters stored in the base station; and
   handing over the user equipment to the identified femto access point.

2. The method as set forth in claim 1, wherein the physical identifier parameter is a physical cell identifier parameter.

3. The method as set forth in claim 1, wherein the global identifier together with the parameters is sent from the user equipment to the base station.

4. The method as set forth in claim 3, further comprising storing the global identifier together with the physical identifier parameter and the further parameter in a list stored in the base station.

5. The method as set forth in claim 1, wherein the time measurements comprise a measurement of timing difference between the femto access point and the base station.

6. The method as set forth in claim 1, wherein the further parameter comprises the tolerance value.

7. An apparatus comprising:
   at least one processor;
   memory storing a program of instructions;
   wherein the memory storing the program of instructions is configured to, with the at least one processor, cause the apparatus to at least:
   in response to initialization of a handover of a user equipment from a base station to a femto access point:
   in response to a request from the base station for a global identifier of the femto access point, decode the global identifier of the femto access point from information about the femto access point transmitted over a broadcast channel and send parameters indicating the femto access point to the base station, wherein the parameters comprise a physical identifier parameter and a further parameter based on time measurements and comprising a tolerance value, wherein each of the time measurements comprises a measurement of a timing difference between the femto access point and the base station, wherein the timing difference comprises the time difference between the synchronization sequence of a first femto access point to a wide area cell and a synchronization sequence of a second femto access point to a wide area cell in addition to one or more handover measurement parameters, and wherein the parameters are further adapted to allow the base station to identify the femto access point by comparing parameters sent from the user equipment to the base station against a list of corresponding parameters stored in the base station, wherein the parameters sent from the user equipment to the base station comprise the physical identifier parameter, the further parameter based on time measurements, and the global identifier of the femto access point, with a list of corresponding parameters stored in the base station, handing over the user equipment to the identified femto access point.

8. An apparatus comprising:
at least one processor;
memory storing a program of instructions;
wherein the memory storing the program of instructions is configured to, with the at least one processor, cause the apparatus to at least:
request a global identifier of a femto access point from a user equipment;
receive from the user equipment parameters indicating a femto access point, wherein the parameters comprise a physical identifier parameter and a further parameter based on time measurements and comprising a tolerance value, wherein each of the time measurements comprises a measurement of a timing difference between the femto access point and the base station, wherein the timing difference comprises the time difference between the synchronization sequence of a first femto access point to a wide area cell and a synchronization sequence of a second femto access point to a wide area cell in addition to one or more handover measurement parameters and wherein the parameters further comprise the global identifier of the femto access point, decoded by the user device from information about the femto access point transmitted over a broadcast channel:
identify the femto access point by comparing parameters received from the user equipment, wherein the parameters comprise the physical identifier parameter, the further parameter based on time measurements, and the global identifier of the femto access point, with a list of corresponding parameters stored in the base station; and
hand over the user equipment to the identified femto access point.

9. The apparatus as set forth in claim 8, wherein the physical identifier parameter is a physical cell identifier parameter.

10. The apparatus as set forth in claim 8, wherein the apparatus is further caused to send the global identifier together with the parameters from the user equipment to the base station.

11. The apparatus as set forth in claim 10, wherein the apparatus is further caused to store the global identifier together with the physical identifier parameter and the further parameter in the list stored in the base station.

12. The apparatus as set forth in claim 8, wherein the apparatus is the base station.

13. A non-transitory computer readable medium storing a program of instructions, execution of which by a processor configures an apparatus to at least:
initialize a handover of a user equipment from a base station to a femto access point;
request a global identifier of the femto access point from the user equipment;
in response to receiving at the base station, from a user equipment connected to the base station, parameters indicating the femto access point, wherein the parameters comprise a physical identifier parameter and a further parameter based on time measurements and comprising a tolerance value, wherein each of the time measurements comprises a measurement of a timing difference between the femto access point and the base station, wherein the timing difference comprises the time difference between the synchronization sequence of a first femto access point to a wide area cell and a synchronization sequence of a second femto access point to a wide area cell in addition to one or more handover measurement parameters, and wherein the parameters further comprise the global identifier of the femto access point, decoded by the user device from information about the femto access point transmitted over a broadcast channel:
identify the femto access point by comparing parameters sent from the user equipment to the base station against a list of corresponding parameters stored in the base station, wherein the parameters sent from the user equipment to the base station comprise the physical identifier parameter, the further parameter based on time measurements, and the global identifier of the femto access point with a list of corresponding parameters stored in the base station; and
hand over the user equipment to the identified femto access point.

* * * * *